(12) United States Patent
Chen

(10) Patent No.: US 6,698,984 B1
(45) Date of Patent: Mar. 2, 2004

(54) STRUCTURE EXTENDIBLE TIP SHORING BAR

(76) Inventor: Ying-Chih Chen, 220, Ta Pu Road, Changhua (TW)

( * ) Notice: Subject to any disclaimer, the term of this patent is extended or adjusted under 35 U.S.C. 154(b) by 0 days.

(21) Appl. No.: 10/294,744

(22) Filed: Nov. 15, 2002

(51) Int. Cl.⁷ .................................................. B60P 7/15
(52) U.S. Cl. ...................................... 410/151; 410/143
(58) Field of Search ............................... 410/143, 145, 410/151; 248/354.6, 354, 7; 211/105.3; 254/12, 95, 109; 74/167, 169, 141.5

(56) References Cited

U.S. PATENT DOCUMENTS

| | | | | |
|---|---|---|---|---|
| 4,781,499 A | * | 11/1988 | Wisecarver | 410/151 |
| 5,094,576 A | * | 3/1992 | Fredelius | 410/151 |
| 5,443,342 A | * | 8/1995 | Huang | 410/151 |
| 5,769,580 A | * | 6/1998 | Purvis | 410/151 |
| 5,890,856 A | * | 4/1999 | Huang | 410/151 |
| 5,947,666 A | * | 9/1999 | Huang | 410/151 |
| 5,988,963 A | * | 11/1999 | Shiau | 410/151 |
| 6,062,782 A | * | 5/2000 | Huang | 410/151 |
| 6,247,882 B1 | * | 6/2001 | Huang | 410/151 |
| 6,390,746 B1 | * | 5/2002 | Huang | 410/151 |

FOREIGN PATENT DOCUMENTS

DE            1080751        *   4/1960   .................. 254/95

\* cited by examiner

*Primary Examiner*—Stephen T. Gordon
(74) *Attorney, Agent, or Firm*—Rabin & Berdo, P.C.

(57) ABSTRACT

An improved structure extendible tip shoring bar comprising an outer rod connected to a base enables the extension and retraction inserted inside the outer rod and base. The base having a levering handle, a safety catch, and an L-shaped linkage, wherein an anterior pawl and a posterior pawl disposed at the front extremity of the levering handle. The posterior pawl and the levering handle are rotatably coupled to the base, while the anterior and posterior pawls contact unidirectionally inclined teeth. Furthermore, a pin projects from the front aspect, with each subjected to tension from the two extremities of an encompassing arcuate spring, and the surface and spring side is against the safety catch and L-shaped linkage. Conversely, toggling the safety catch to actuate the L-shaped linkage and elevate the anterior and the posterior pawls allow the inner rod pushed inside the outer rod, achieving a more convenient operation.

1 Claim, 5 Drawing Sheets

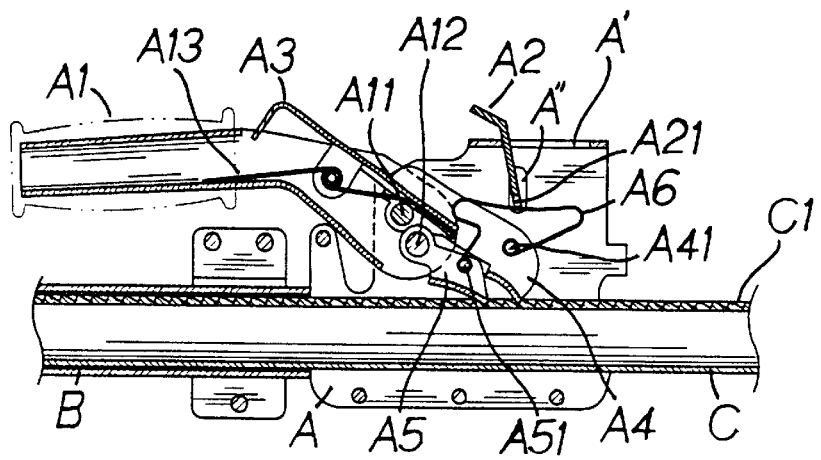
FIG. 2-A
PRIOR ART
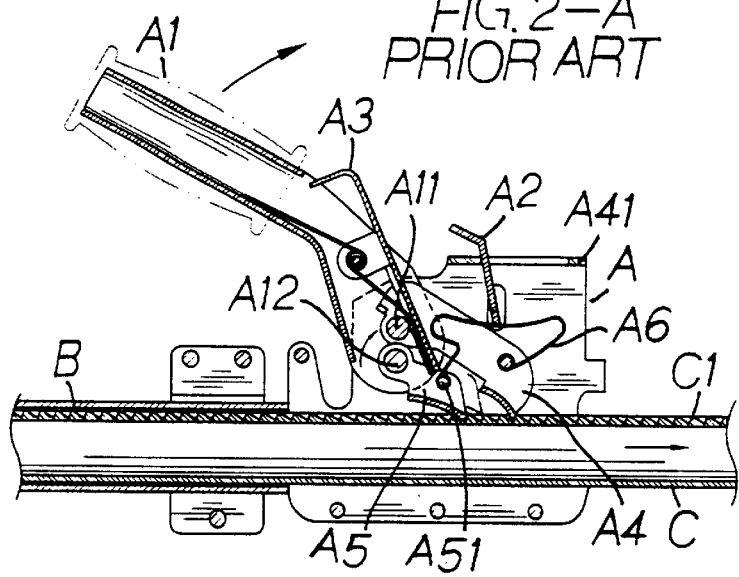
FIG. 2-B
PRIOR ART
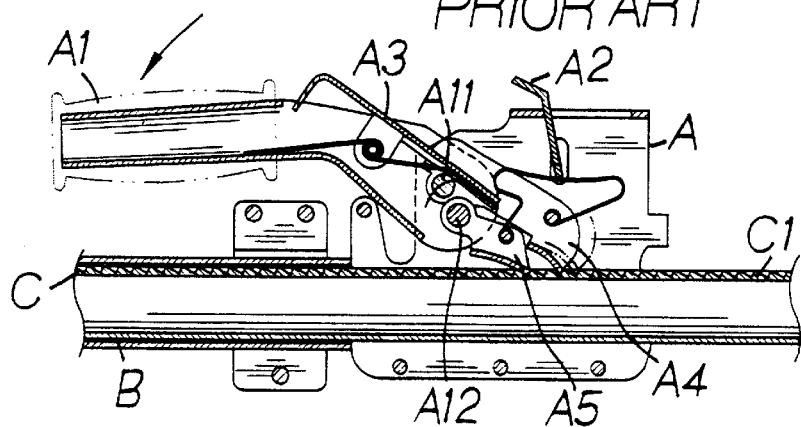
FIG. 2-C
PRIOR ART

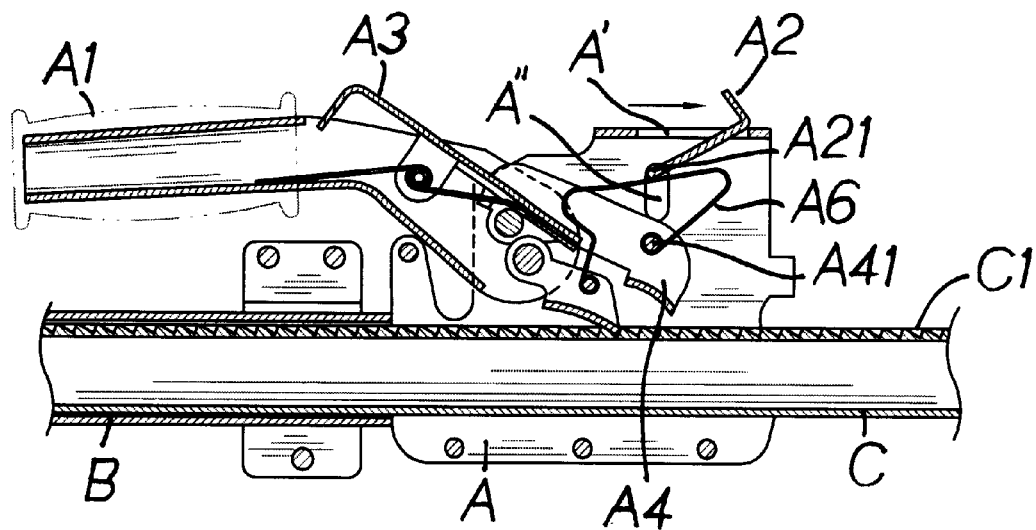
FIG. 2-D
PRIOR ART
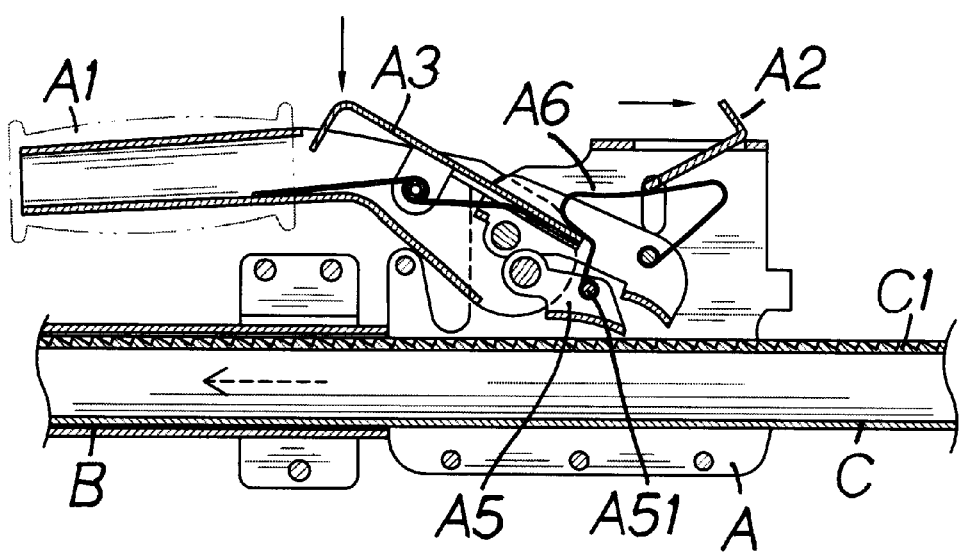
FIG. 2-E
PRIOR ART

STRUCTURE EXTENDIBLE TIP SHORING BAR

BACKGROUND OF THE INVENTION

1) Field of the Invention

The invention herein relates to accessories that prevent cargo shifting in transport vehicles, specifically an improved structure extendible tip shoring bar in which a safety catch and an L-shaped linkage are disposed in a base such that it is only necessary to toggle the safety catch and thus synchronously actuate the L-shaped linkage to enable the movement of an inner rod inside an outer rod, thereby achieving full release and collapse in a convenient and efficient operation.

2) Description of the Prior Art

In delivery vehicles, regardless of cargo capacity, now utilized by the freight forwarding industry, goods are packaged in cartons to facilitate loading and stacking. Since packaging in cartons protects contained articles from damage en route, most delivery persons normally place the cartons as close together as possible because tight stacks are less likely to sway and slip as a result of road conditions, and thus shipments to designated destinations only proceed after the entire cargo hold is fully loaded. However, as goods are delivered, more and more cargo space becomes vacant and the remaining cartons start sliding towards the vehicle loading gate due to road conditions. If driving over a poorly surfaced road, sudden braking for a red light, sudden acceleration at a green light, and other situations occur at this time, cartons may fall out of the cargo hold—destroying the contents and tearing the cartons, and sustain other damage from being strewn on the ground. While there is of course the possibility that cartons are fortunately not damaged, such occurrences usually result in the shipper becoming liable for monetary compensation demanded by the contracting customer, which in the shipping industry is deeply troublesome.

As a result, a structure (as shown in FIG. 1) has been devised to protect cartons under such situations, which, as indicated in FIG. 2-A, is comprised of an outer rod B which after being connected to a base A enables the extension and retraction of an inner rod C inserted inside both the outer rod B and base A. The base A and outer rod B are conjoined into a single unitary entity having a levering handle A1, a first trigger A2, and a second trigger A3 exposed on the assembly, wherein an anterior pawl A4 and a posterior pawl A5 respectively pivot on two shafts A11 and A12 disposed at two locations at the front extremity of the levering handle A1, of which the posterior pawl A5 and the levering handle A1 are rotatably coupled to the base A, while the anterior pawl A4 and posterior pawl A5 contact unidirectionally inclined teeth C1 arrayed along the surface of the inner rod C. Furthermore, a pin A41 and A51 respectively projects from the front aspect of the anterior pawl A4 and posterior pawl A5, with each subjected to tension from the two respective extremities of an encompassing arcuate spring A6. The lower end of the first trigger A2 rests against the spring A6 such that after the protruding sections A21 proceeding laterally from the bottom two sides of the first trigger A2 are inserted into the opening A' of the base A, they slide into the base A adjustment holes A", while the second trigger A3 is hinged to the levering handle A1 and preloaded by a torque spring A13. When the first trigger A2 is pressed against the spring A6 and the L—second trigger A3 remains stationary, both the anterior pawl A4 and the posterior pawl A5 engage the unidirectionally inclined teeth C1 on the surface of the inner rod C. Since the pivot point of the posterior pawl A5 with the levering handle A1 is the shaft A12 of the base A and the anterior pawl A4 pivots with the levering handle A1 and, furthermore, the anterior pawl A5 is against the unidirectionally inclined teeth C1 on the surface of the inner rod C, when the levering handle A1 is pulled up, the anterior pawl A4 shaft A11 is brought forward such that the anterior pawl A4 enables the inner rod C to move outward and the displacement of the posterior pawl A5 to the next tooth, as indicated in FIG. 2-B. When the levering handle A1 is pressed down, the posterior pawl A5 remains stationary and the anterior pawl A4 shaft A11 returns to the rear extent of the posterior pawl A5 such that the anterior pawl A4 moves back towards the posterior pawl A5, as shown in FIG. 2-C and thus, operating the levering handle A1 as such for a certain number of repetitions causes the outward extension of the inner rod C until the both lateral tips of the inner rod C and the outer rod B are positively situated against the two walls D1 of the cargo hold D, as indicated in FIG. 1, providing stable support to thereby prevent the falling of each layer of cartons E.

Conversely, when the inner rod C and the outer rod B are released, the first trigger A2 is pushed outward, causing the spring A6 to resiliently elevate and impel the anterior pawl A4 upward, as indicated in FIG. 2-D. The second trigger A3 is then pushed down until the spring A6 is articulated upward such that the spring A6 lifts the posterior pawl A5, as indicated in FIG. 2-E. As such, when both the anterior pawl A4 and the posterior pawl A5 are disengaged from the unidirectionally inclined teeth C1 on the surface of the inner rod C, the inner rod C can be retracted inside the outer rod B to achieve release. However, during the release operation, the user must use one hand to hold the base A and the other hand to work the first trigger A2 and the second trigger A3, a procedure that is not entirely convenient.

Since the structural design of the prior art is not very ideal, the applicant conducted extensive research based on years of experience gained while engaged in the relevant fields which culminated in the successful development of the invention herein, now submitted as a patent application.

SUMMARY OF THE INVENTION

The primary objective of the invention herein is to provide an improved structure extendible tip shoring bar comprised of an outer rod which after being connected to a base enables the extension and retraction of an inner rod inserted inside both the said outer rod and base, with a safety catch consisting of an actuated L-shaped linkage disposed in the base such when the said safety catch is pressed, the L-shaped linkage pushes a spring in the base, thereby raising an anterior pawl and a posterior pawl at the two extremities of the spring and enabling the retraction of the inner rod inside the outer rod to achieve full release and collapse in a more convenient and practical operation.

To enable a further understanding of the structural features, operation, and other items of the present invention for purposes of review and reference, the brief description of the drawings below is followed by the detailed description of the invention herein.

BRIEF DESCRIPTION OF THE DRAWINGS

FIG. 2-A is a cross-sectional drawing of the prior art after installation.

FIG. 2-B is a cross-sectional drawing of the prior art levering handle when pulled up.

FIG. 2-C is a cross-sectional drawing of the prior art levering handle when pressed down.

FIG. 2-D is a cross-sectional drawing of the prior art first trigger impelling the anterior pawl upward.

FIG. 2-E is a cross-sectional drawing of the prior art second trigger impelling the posterior pawl upward.

DETAILED DESCRIPTION OF THE INVENTION

Figure 3:
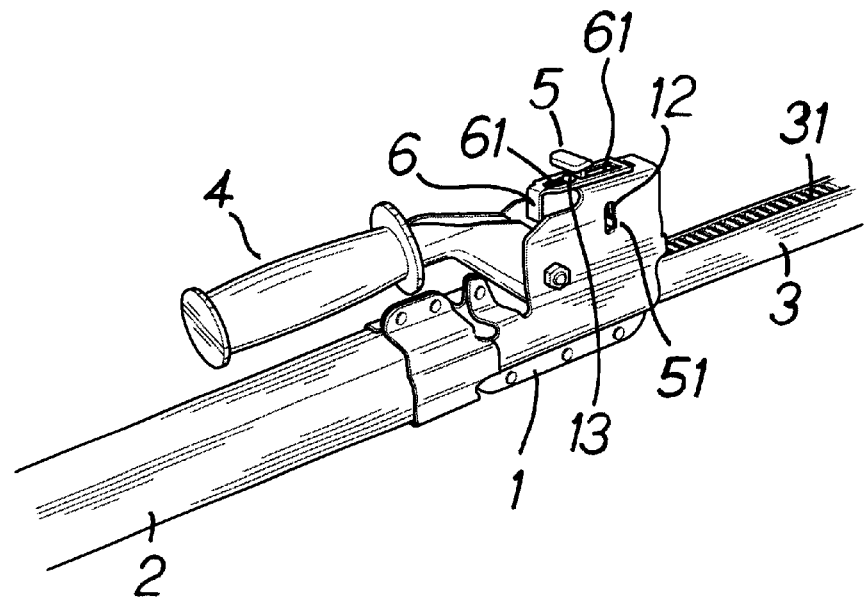
FIG. 3 is an isometric drawing of the invention herein following installation.
Figure 4:
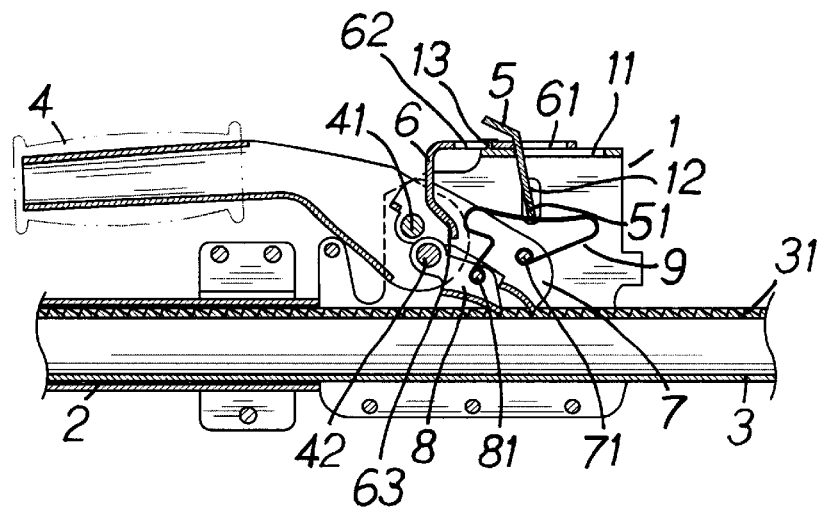
FIG. 4 is a cross-sectional drawing of the invention herein following installation.

Referring to FIG. 3 and FIG. 4, the improved structure extendible tip shoring bar of the invention herein is comprised of an outer rod 2 which, after being connected to a base 1, enables the extension and retraction of an inner rod 3 inserted inside both the outer rod 2 and base 1. The base 1 and outer rod 2 are conjoined into a single unitary entity having a levering handle 4, a safety catch 5, and an L-shaped linkage 6 exposed on the assembly. An anterior pawl 7 and a posterior pawl 8 respectively pivot on two shafts 41 and 42 disposed at two locations at the front extremity of the levering handle 4. The posterior pawl 8 and the levering handle 4 are rotatably coupled to the base 1, while the anterior pawl 7 and posterior pawl 8 contact unidirectionally inclined teeth 31 arrayed along the surface of the inner rod 3. Furthermore, a short pin 71 and 81 respectively projects from the front aspect of the anterior pawl 7 and posterior pawl 8, with each subjected to tension from the two respective extremities of an encompassing arcuate spring 9. The lower end of the safety catch 5 rests against the spring 9. Protruding sections 51 protruding laterally from the bottom two sides of the safety catch 5 are inserted into the opening 11 of the base 1, and slide into the base adjustment holes 12. The L-shaped linkage 6 is fitted to the safety catch 5 and onto the base locking column 13 by means of two slots 61 and 62 formed lengthwise in it, with the curved section 63 at the short side situated against the spring 9.

Figure 1:
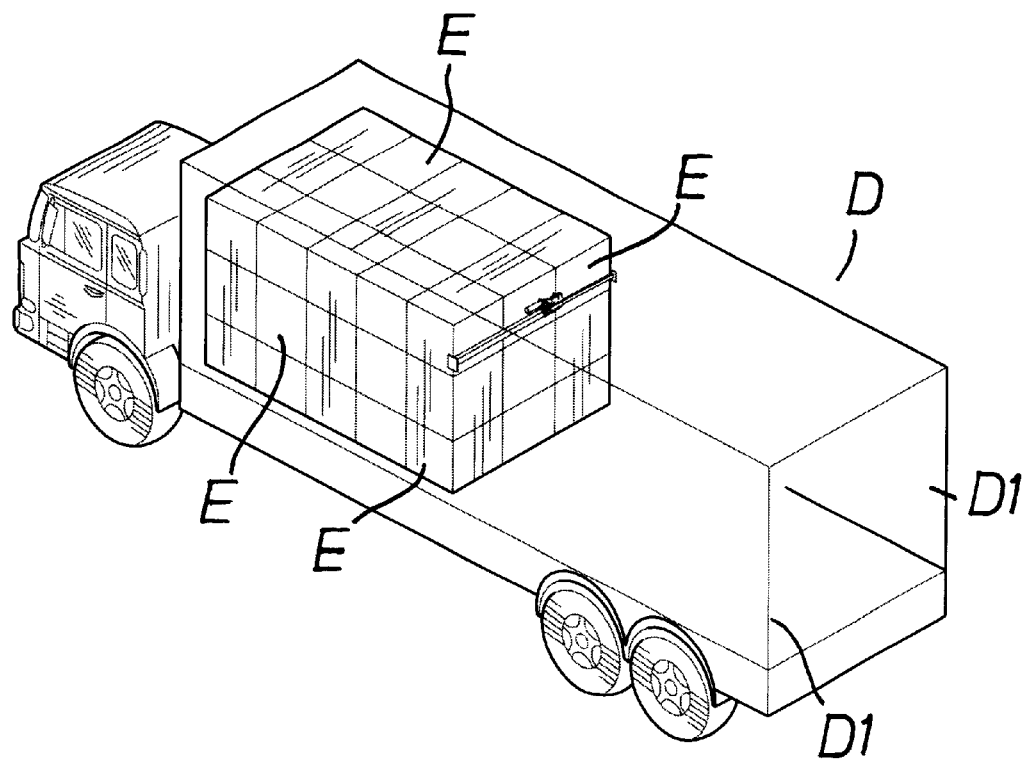
FIG. 1 is an isometric drawing of an extendible tip shoring bar.
Figure 5:
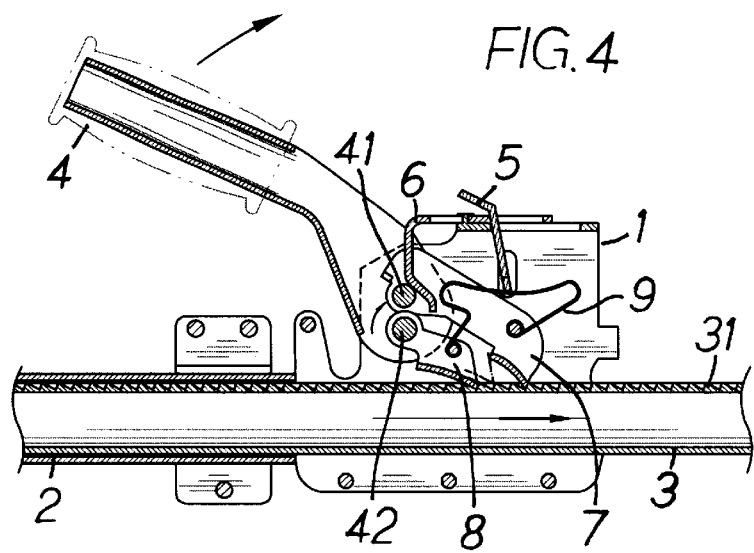
FIG. 5 is a cross-sectional drawing of the invention herein when the levering handle is pulled up.
Figure 6:
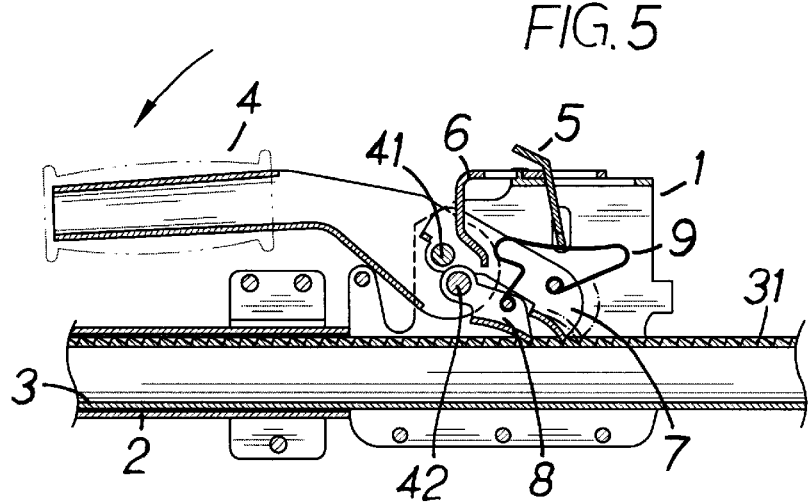
FIG. 6 is a cross-sectional drawing of the invention herein when the levering handle is pressed down.

To wedge the tips of the inner rod 3 and the outer rod 2 such that they are installed as shown in FIG. 1, the safety catch 5 is pressed against the spring 9 such that the L-shaped linkage 6 no longer contacts the spring 9, as indicated in FIG. 3, and both the anterior pawl 7 and the posterior pawl 8 engage the unidirectionally inclined teeth 31 on the surface of the inner rod 3. Since the pivot point of the posterior pawl 8 and the levering handle 4 is the shaft 42 of the base 1, and the anterior pawl 7 rotates with the levering handle 4 and, furthermore, the anterior pawl 7 is against the unidirectionally inclined teeth 31 on the surface of the inner rod 3, when the levering handle 4 is pulled up, the anterior pawl shaft 41 is brought forward such that the anterior pawl 7 enables the inner rod 3 to move outward and the posterior pawl 8 displaces to the next tooth, as indicated in FIG. 5. When the levering handle 4 is pressed down, the posterior pawl 8 remains stationary and the anterior pawl shaft 41 returns to the rear extent of the posterior pawl 8 such that the anterior pawl 7 moves back towards the posterior pawl 8, as shown in FIG. 6. Operating the levering handle 4 as such for a certain number of repetitions causes the outward extension of the inner rod 3 until the both lateral tips of the inner rod 3 and the outer rod 2 are positively situated against the two walls D1 of the cargo hold D, providing stable support to thereby prevent the falling of each layer of cartons E.

Figure 7:
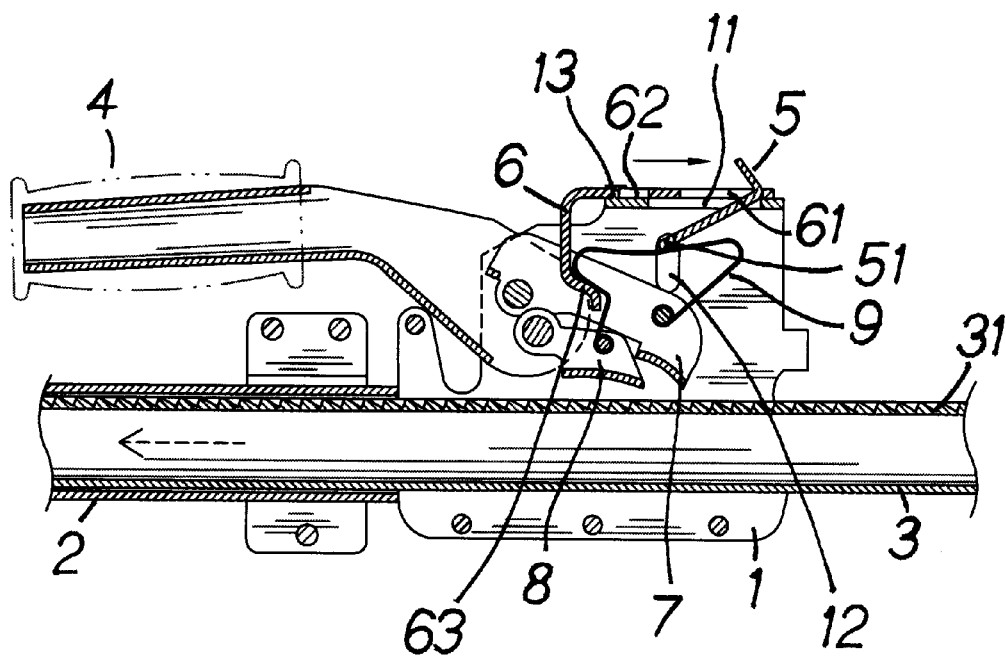
FIG. 7 is a cross-sectional drawing of the invention herein that illustrates how the inner rod moves out from the inside of the outer rod.

When release is effected, since the L-shaped linkage 6 and the safety catch 5 are fitted together, when the safety catch 5 is pushed, the L-shaped linkage 6 moves in the same direction, as indicated in FIG. 7. As such, the spring 9 accordingly moves upward and while the linkage 6 is in motion, the curved section 63 at its short side against the spring 9 shoves the spring 9 upwards, thereby raising the anterior pawl 7 and the posterior pawl 8 at the two extremities of the spring 9 such that two pawls 7 and 8 are disengaged from the unidirectionally inclined teeth 31 on the surface of the inner rod 3 to thereby enable the retraction of the inner rod 3 inside the outer rod 2. Therefore, when the safety catch 5 of the invention herein is operated, the linkage 6 is actuated such that toggling the safety catch 5 once enables the full release and collapse of the extendible tip shoring bar in a more convenient operation. As such, since the structural design of the present invention is capable of a more convenient release operation, is of enhanced performance, and thus meets new patent application requirements, the invention herein is submitted to the patent bureau for review and the granting of the commensurate patent rights.

What is claimed is:

1. An extendible tip shoring bar, comprising:

a base having an opening, a locking column and base adjustment holes;

an inner rod having unidirectionally inclined teeth arranged along a surface thereof;

an outer rod which is connected to said base to enable an extension and retraction of said inner rod inserted inside both said outer rod and said base; said base and said outer rod being conjoined into a single unitary entity;

a levering handle;

a safety catch extending through the opening of said base so that a portion of said safety catch is exposed, and having protruding sections protruding laterally from bottom two sides thereof;

an exposed L-shaped linkage having a long side having two slots formed lengthwise therein, and having a short side having a curved section;

an anterior pawl and a posterior pawl respectively pivotally disposed on two shafts disposed at two locations at a front extremity of the said levering handle, said posterior pawl and said levering handle being rotatably coupled to said base, said anterior pawl and posterior pawl being arranged to contact the unidirectionally inclined teeth of said inner rod;

an arcuate spring;

pins respectively projecting from a front aspect of said anterior pawl and said posterior pawl, with each pin being subjected to tension from two respective extremities of said arcuate spring;

wherein a lower end of said safety catch rests against said spring such that the protruding sections of said safety catch slide in the base adjustment holes, wherein said L-shaped linkage is fitted to said safety catch and onto the locking column by means of the two slots, with the curved section being situated against said spring; and wherein when operated, said levering handle moves said inner rod outwards such that said inner and outer rods can be solidly wedged into an installed position and when said inner and outer rods are to be released, pushing said safety catch moves said L-shaped linkage in a same direction, with said spring consequently articulating upward, with extremities of said anterior pawl and said posterior pawl rising, allowing said inner rod to be pushed inside said outer rod so that said safety catch only has to be toggled once to achieve full release and collapse.

* * * * *